(No Model.)
C. R. BANNIHR.
DROP PRESS BELT PROTECTOR.
No. 260,822. Patented July 11, 1882.
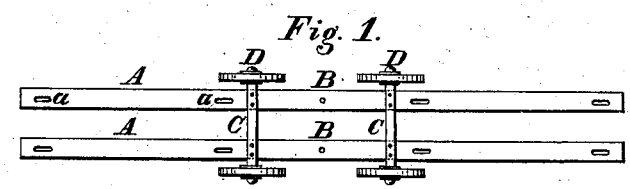
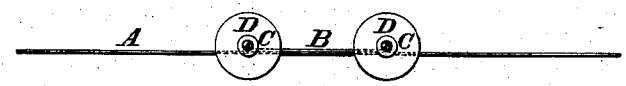
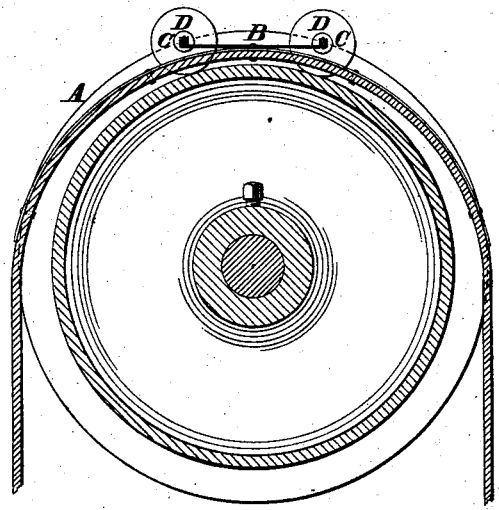
WITNESSES:
INVENTOR

UNITED STATES PATENT OFFICE.

CÆSAR R. BANNIHR, OF WEST CHESHIRE, CONNECTICUT.

DROP-PRESS BELT-PROTECTOR.

SPECIFICATION forming part of Letters Patent No. 260,822, dated July 11, 1882.

Application filed October 5, 1881. (No model.)

*To all whom it may concern:*

Be it known that I, CÆSAR R. BANNIHR, a citizen of the United States, residing at West Cheshire, in the county of New Haven and State of Connecticut, have invented a new and useful arrangement for suspending and protecting the belt or rope of a drop-press when the same is not in use; and I do hereby declare that the following is a full, clear, and exact description thereof, which will enable others to make and use the same, reference being had to the accompanying drawings.

My invention consists of a device by which the belt or rope of a drop-press may be suspended over the moving pulley when the drop is not in use, thereby avoiding unnecessary wear and noise of the belt, and at the same time keeping it ready for use the same as were the said belt or rope in contact with the pulley.

The object of my invention is to prevent the unnecessary wear of a belt or rope of a drop-press while the said belt or rope is hanging idle over the moving pulley of said drop-press. I attain this object by the arrangement illustrated in the accompanying drawings, of which—

Figure 1 represents a face view; Fig. 2, an edge view, and Fig. 3 a cross-section of the device attached to the belt hanging over the pulley.

Similar letters refer to similar parts of the device, which consists of two thin strips of spring metal or wire, A, fastened to the upper side of the belt (or rope, in case a rope is used) by means of rivets or otherwise by the oblong holes *a*, these holes being oblong to admit of the stretch in the belt or rope. In connection with the springs A there are two springs, B, of the same material, fastened to the shafts C, which are attached to the rolls D, of rawhide or other suitable material, thus forming a carriage, by which the belt or rope is suspended over the pulley. The spring or springs A keep the belt or rope off from the pulley. The springs B are to raise the springs A, belt and all. The rolls D, attached to the shafts C, which are attached to the ends of the springs B, are to roll on the periphery or face of the pulley. The springs B are to admit of the belt being brought down onto the pulley when in use and to raise it the moment the drop is set at rest.

Having fully described my invention, what I claim as new, and desire to secure by Letters Patent, is—

1. The manner of suspending over the pulley of a drop-press the belt or rope by means of a spring or springs, A.

2. In connection with the springs A, the springs B, attached to and acting with the springs A.

3. In combination with the springs A and B, the shafts C and rolls D, forming a carriage rolling on the periphery of the pulley, thus keeping the belt or rope above and off from the pulley, substantially as and for the purpose set forth.

CÆSAR R. BANNIHR.

Witnesses:
AUGUSTUS C. PECK,
TITUS B. IVES.